(12) United States Patent
Hsiao et al.

(10) Patent No.: US 7,877,859 B2
(45) Date of Patent: Feb. 1, 2011

(54) SHIELD FABRICATION OF MAGNETIC WRITE HEADS

(75) Inventors: Wen-Chien Hsiao, San Jose, CA (US);
Yimin Hsu, Sunnyvale, CA (US);
Vladimir Nikitin, Campbell, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 743 days.

(21) Appl. No.: 11/767,330

(22) Filed: Jun. 22, 2007

(65) Prior Publication Data

US 2008/0313885 A1    Dec. 25, 2008

(51) Int. Cl.
G11B 5/127    (2006.01)
H04R 31/00    (2006.01)

(52) U.S. Cl. ............... 29/603.13; 29/603.07; 29/603.01; 29/846; 29/852; 360/110; 360/317; 360/122; 360/125.01; 216/22

(58) Field of Classification Search .............. 29/603.07, 29/603.01, 603.03, 603.13–603.19, 830, 29/846, 852; 360/110, 317, 319, 320, 122, 360/125.01–125.04, 125.13, 125.3; 216/22
See application file for complete search history.

(56) References Cited

U.S. PATENT DOCUMENTS

| 4,650,545 A | * | 3/1987 | Laakso et al. ................. 216/13 |
|---|---|---|---|
| 6,278,591 B1 | | 8/2001 | Chang et al. |
| 6,387,285 B1 | | 5/2002 | Sasaki |
| 6,721,138 B1 | | 4/2004 | Chen et al. |
| 2002/0159200 A1 | | 10/2002 | Ju et al. |
| 2004/0097173 A1 | * | 5/2004 | Crawforth et al. ............. 451/41 |
| 2004/0218312 A1 | | 11/2004 | Matono |
| 2006/0044681 A1 | * | 3/2006 | Le et al. ..................... 360/126 |
| 2006/0044682 A1 | * | 3/2006 | Le et al. ..................... 360/126 |
| 2007/0242389 A1 | * | 10/2007 | Balamane et al. ........... 360/126 |

* cited by examiner

*Primary Examiner*—Derris H Banks
*Assistant Examiner*—Jeffrey Carley
(74) *Attorney, Agent, or Firm*—Duft Bornsen & Fishman, LLP

(57) ABSTRACT

Methods are provided for fabricating a write head with a self aligned wrap around shield and a self aligned flared region of a write pole. A flare point and a track width of a write pole may be fabricated using multiple processes. The multiple processes utilize several masking structures to define the track width and the flare point of the write pole. A mask structure is formed to cover a first portion of the write pole. An edge of the mask structure adjacent to an exposed second portion of the write pole defines a flare point of the write pole. Various structures of the write head, including shield gap layers, a wrap around shield and a flared region (e.g., the yoke) of the write pole may be fabricated from the flare point defined by the mask structure.

6 Claims, 18 Drawing Sheets

SHIELD FABRICATION OF MAGNETIC WRITE HEADS

BACKGROUND OF THE INVENTION

1. Field of the Invention

The invention is related to the field of magnetic disk drive systems and, in particular, to fabricating wrap around shields of a write head.

2. Statement of the Problem

Magnetic disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

Write heads and other components of the recording heads are typically produced using thin-film deposition and patterning techniques. The several material layers which make up a write head for a magnetic recording head are typically formed by depositing full film materials of the write pole layers on a wafer substrate, depositing and patterning a masking layer over the write pole layers to form a mask structure, etching the exposed portion of the write pole layers around the mask structure, and then removing the mask structure. A trailing shield or wrap around shield may then be formed around the write pole using a similar process. A wrap around shield comprises a trailing shield along a trailing surface of the write pole, and side shields disposed on sides (i.e., along surfaces of the write pole adjacent to neighboring tracks) of the write pole. Shields are formed to prevent the write pole from writing to neighboring tracks or bits during a writing process.

Prior art write head fabrication processes encounter problems in precisely aligning the layers of the write head with each other and with respect to the center of the write head. Further, problems are encountered in accurately controlling the dimensions of the write pole and write head. These dimensions include the track width of the write pole, the flare point, the flare length and the throat height of the write head. For example, the dimensions of the write pole and the location of the flare point of the write pole are typically fabricated at the same time using a photolithographic process. Defining both the track width and the flare point of the write pole at the same time results in an alignment of the flare point and the track width with respect to other structures of the write head which is not as accurate as desired. Further, another photolithographic process is used to define the trailing or wrap around shield, which leads to additional alignment problems because of limitations in the accuracy of the photolithographic process. Because of these alignment issues, the various structures of the write head may not be accurately aligned, which may lead to recording problems of the write head.

SUMMARY OF THE SOLUTION

Embodiments of the invention solve the above and other related problems with improved methods for fabricating write heads. More particularly, a flare point and a track width of a write pole may be fabricated using multiple processes in separate steps. The multiple processes utilize several masking structures to define the track width and the flare point of the write pole. Various structures of the write head, including shield gap layers, a wrap around shield and a flared region (e.g., the yoke) of the write pole may be fabricated from a flare point defined by one of the processes. The flare point and the wrap-around shield are fabricated using a single photolithography layer, greatly improving the tolerance of the write head. Advantageously, these processes fabricate a self aligned wrap around shield and a self aligned flared region of the write pole, which forms a more accurately aligned write pole with better recording properties.

An embodiment of the invention comprises a method for forming a write head. The method comprises defining a track width of a write pole of the write head using a first mask structure. The method further comprises removing the first mask structure and forming a second mask structure to cover a first portion of the write pole. An edge of the second mask structure formed adjacent to an exposed second portion of the write pole defines a flare point of the write pole. The method further comprises forming a shield gap structure around the second portion of the write pole, and forming a wrap around shield around the second portion of the write pole. The wrap around shield is separated from the flare point by the shield gap structure. The method further comprises removing the second mask structure, and forming a flared region of the write pole using a third mask structure. The flared region of the write pole is formed over the first portion of the write pole from the flare point of the write pole that was previously defined by the edge of the second mask structure.

Another exemplary embodiment of the invention comprises a method for fabricating a write head that allows for improved tolerance in the alignment of the flared region of the write pole with respect to a main pole of the write pole. The method is similar to the previously described method for fabricating a write head. However, prior to forming the flared region, the method comprises forming magnetic material along sides of the first portion of the write pole to increase a thickness of the write pole. This increased thickness of the magnetic material along the sides of the straight portion of the write pole acts as a primary flare, and is a factor in the head performance. The increased thickness of the first portion of the write pole provides an increased tolerance during fabrication of the flared region of the write pole. Advantageously, a flared region of a write pole which normally would be considered misaligned with respect to the main pole may be used in a recording head because of the increased tolerance of the fabrication process. More specifically, the increased thickness of the second portion of the write pole provides a wider tolerance for aligning the main pole with the flared region of the write pole. The surface edge of the flared region along the flare point is wider, so if the main pole is misaligned from the center of the flared region, there will still be a sufficient amount of surface area of the flared region on each side of the main pole to provide adequate magnetic properties for the write head.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-33 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
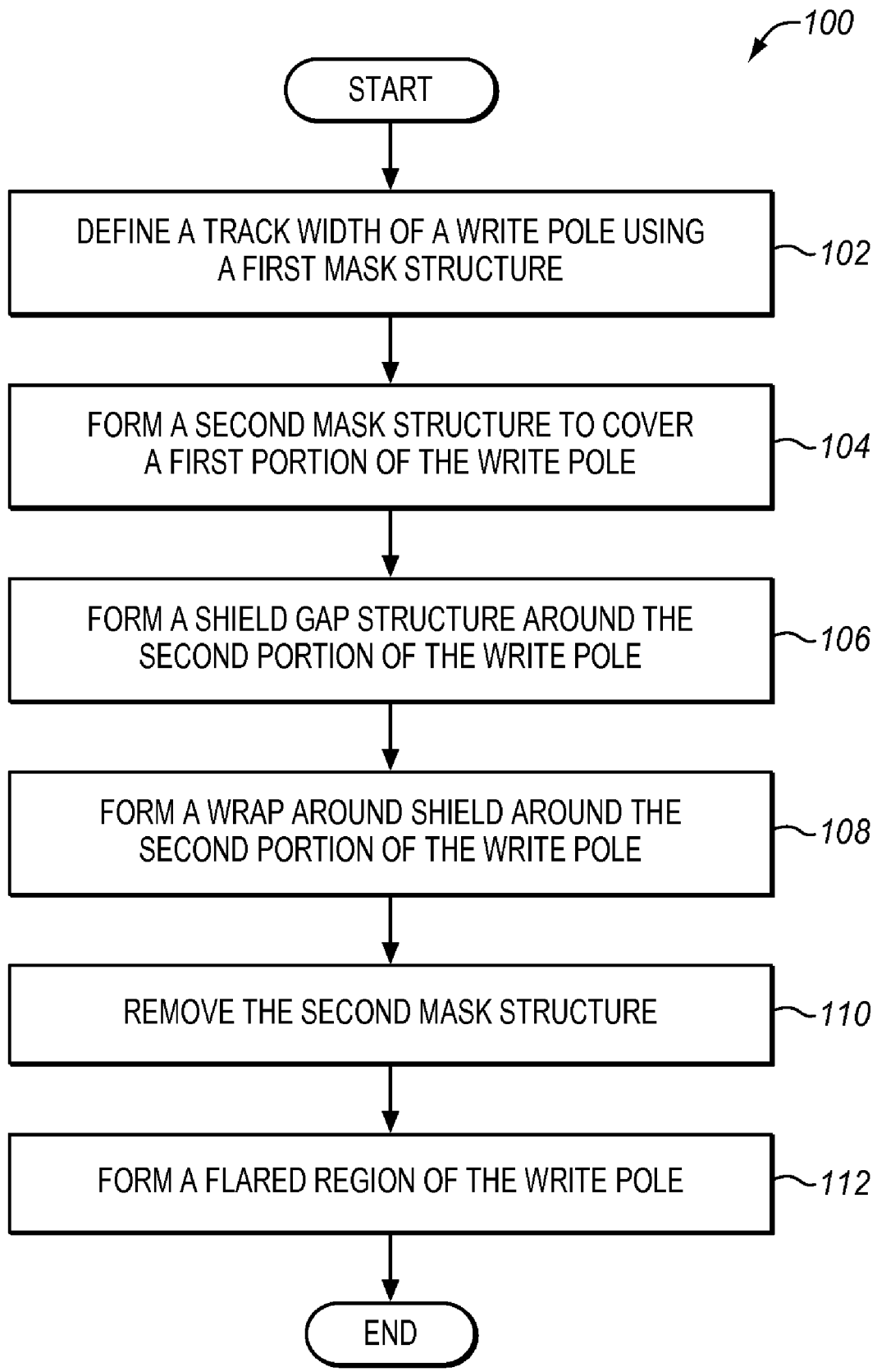
FIG. 1 illustrates a method for fabricating a write head in an exemplary embodiment of the invention.

FIG. 1 illustrates a method 100 for fabricating a write head in an exemplary embodiment of the invention. FIGS. 2-9 illustrate cross sectional views of a write head 200 fabricated according to method 100 of FIG. 1 in exemplary embodiments of the invention. The steps of method 100 will be described with reference to write head 200 illustrated in FIGS. 2-9. The steps of method 100 may not be all-inclusive, and may include other steps not shown for the sake of brevity.

Figure 2:
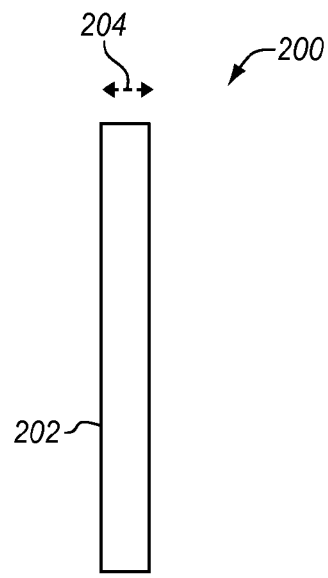
FIGS. 2-9 illustrate cross sectional views of a write head fabricated according to the method of FIG. 1 in exemplary embodiments of the invention.

Step 102 comprises defining a track width 204 (see FIG. 2) of a write pole 202 of write head 200 using a first mask structure (not shown in FIG. 2). The process of defining track width 204 of write pole 202 may comprise depositing a layer of write pole material (e.g., CoFe) and depositing a layer of masking material. Portions of the layer of masking material may be removed to form the first mask structure. Portions of the layer of write pole material not protected by the mask structure may then be removed to define track width 204 of write pole 202. FIG. 2 illustrates a top view of write head 200 after completion of step 102 in an exemplary embodiment of the invention.

Figure 3:
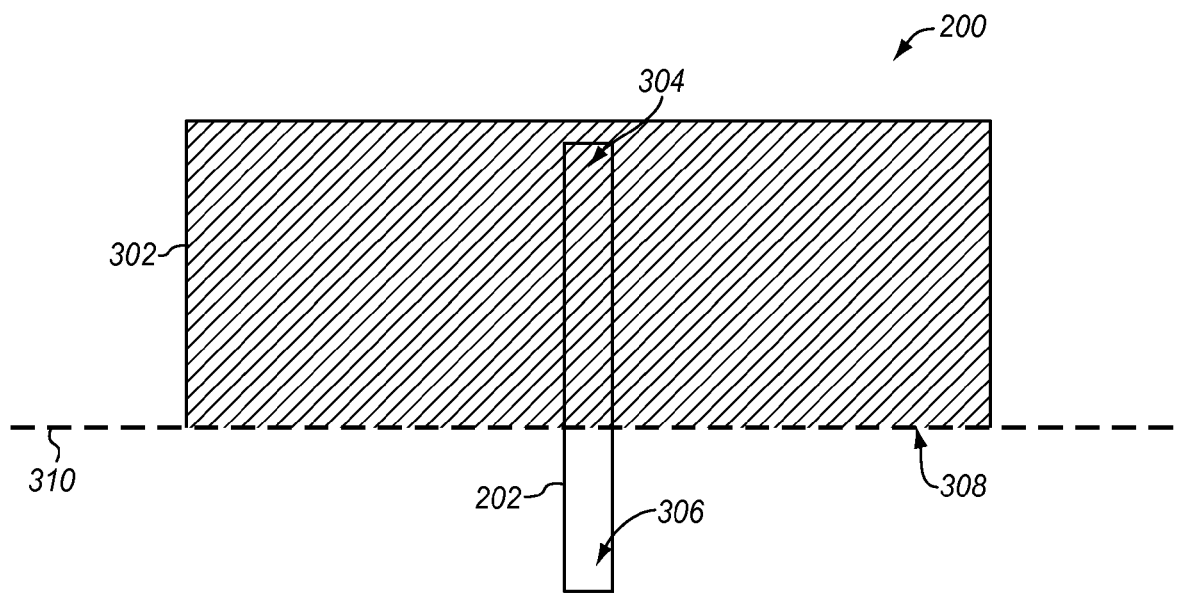

Step 104 comprises forming a second mask structure 302 to cover a first portion 304 of write pole 202. Second mask structure 302 may be formed by depositing a layer of second mask material, such as Rh, and performing a photolithographic process to remove a portion of the layer of second mask material. An edge 308 of second mask structure 302 adjacent to an exposed second portion 306 of write pole 202 defines a flare point 310 of write pole 202. Flare point 310 may be used as a reference point to form additional structures of write head 200. FIG. 3 illustrates a top view of write head 200 after completion of step 104 in an exemplary embodiment of the invention.

Figure 4:
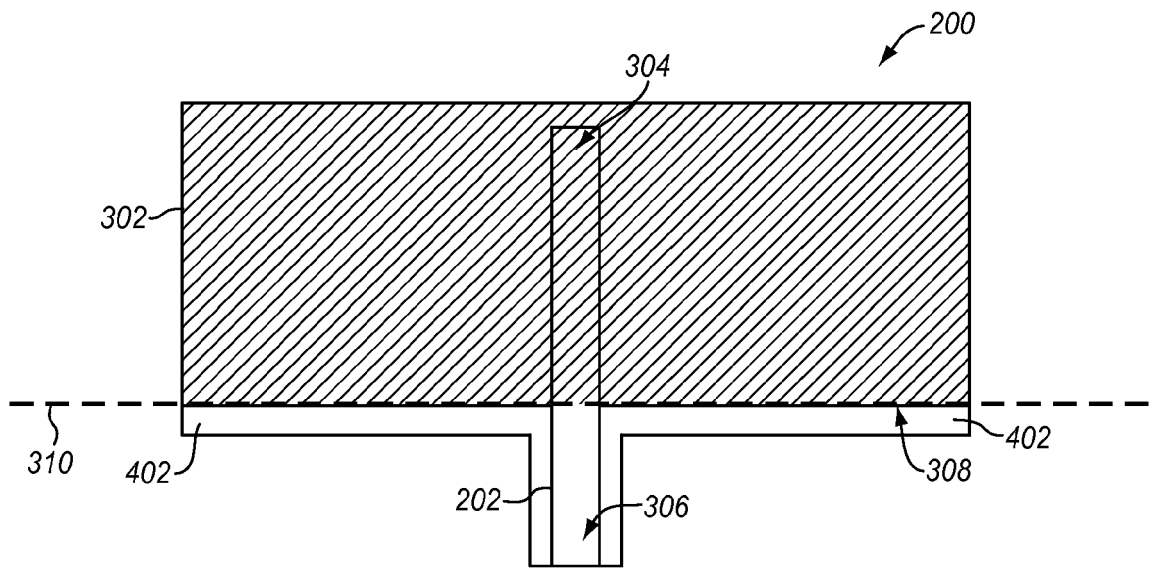

Step 106 comprises forming a shield gap structure 402 (see FIG. 4) around second portion 306 of write pole 202. Shield gap structure 402 is formed on side surfaces and a trailing surface of write pole 202, and defines a side gap of a subsequently formed wrap around shield. Shield gap structure 402 is also formed over second portion 306 of write pole 202 (not shown in FIG. 4) to form a trailing gap of write pole 202. Shield gap structure 402 may be formed by depositing a layer of non-magnetic material, such as $Si_3N_4$, and removing portions of the layer of non-magnetic material to form shield gap structure 402. FIG. 4 illustrates a top view of write head 200 after completion of step 106 in an exemplary embodiment of the invention.

Figure 5:
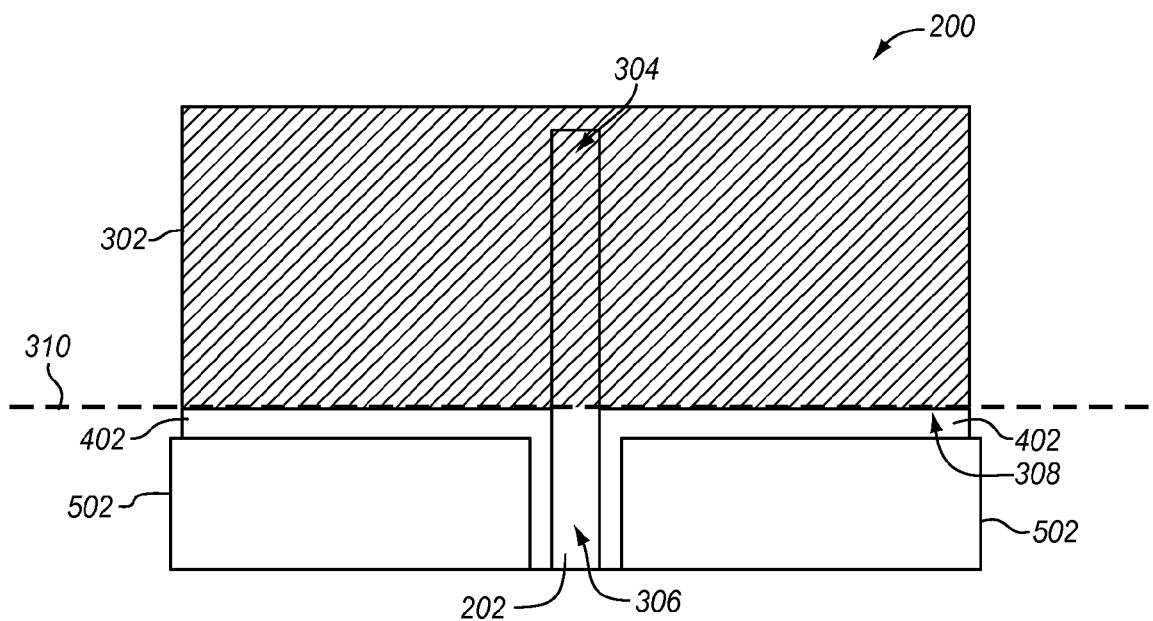

Step 108 comprises forming a wrap around shield 502 (see FIG. 5) around second portion 306 of write pole 202. Shield gap structure 402 defines a gap between an edge of wrap around shield 502 (e.g., the top edge of wrap around shield 502 in FIG. 5) and flare point 310. An electroplating process may be performed to fabricate wrap around shield 502. FIG. 5 illustrates a top view of write head 200 after completion of step 108 in an exemplary embodiment of the invention.

Figure 6:
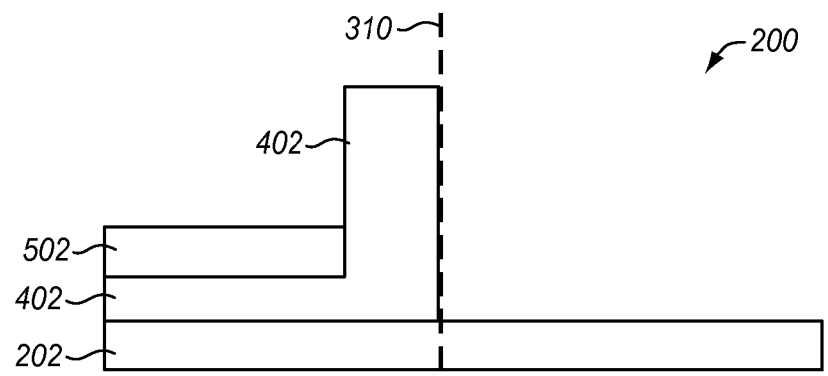

Wrap around shield 502 is also formed over second portion 306 of write pole 202. FIG. 6 illustrates a side cross sectional view of write head 200 after completion of step 108 in an exemplary embodiment of the invention. Shield gap structure 402 is formed on top of write pole 202 along flare point 310, and extending to a main pole edge (i.e., left of flare point 310 in FIG. 6) of write pole 202. Wrap around shield 502 is formed above shield gap structure 402 extending to a main pole edge of write pole 202.

Figure 7:
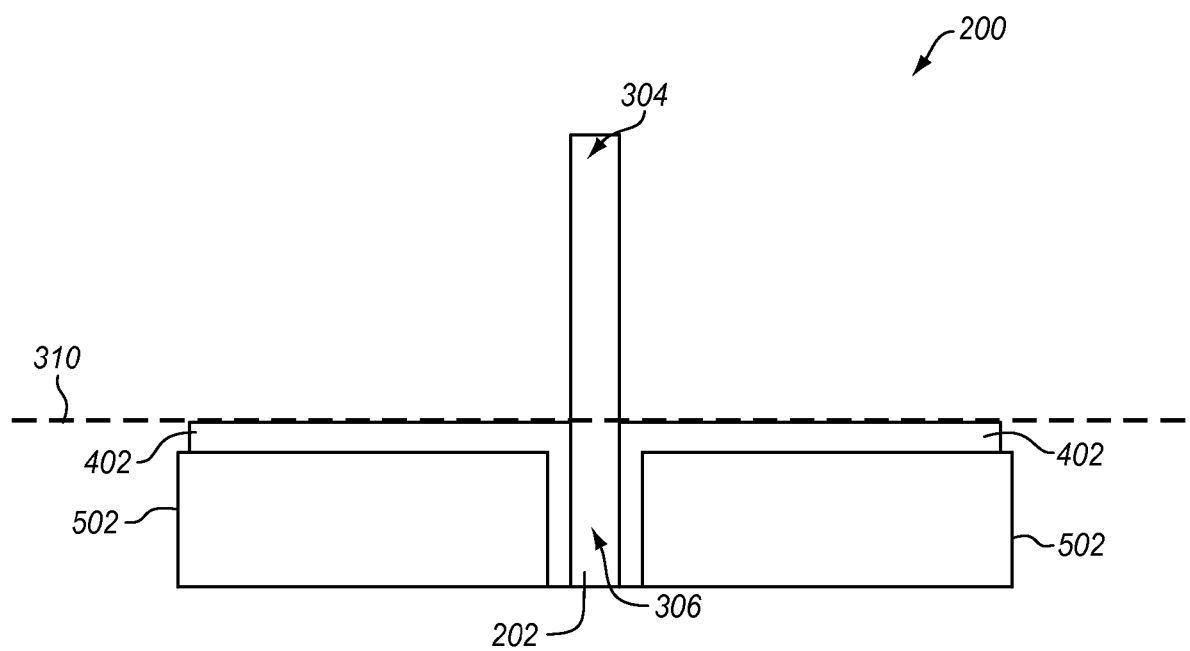

Step 110 comprises removing second mask structure 302. FIG. 7 illustrates a top view of write head 200 after completion of step 110 in an exemplary embodiment of the invention. Step 112 comprises forming a flared region 802 (see FIG. 8) of write pole 202 using a third mask structure (not shown in FIG. 8). Flared region 802 (e.g., a yoke) is a portion of write pole 202 extending beyond flare point 310 on a side opposite an air bearing surface (ABS) of write head 200. Flared region 802 is formed over first portion 304 of write pole 202 from flare point 310. Flared region 802 is formed of a magnetic material, and flared region 802 and write pole 202 are magnetically coupled.

Figure 8:
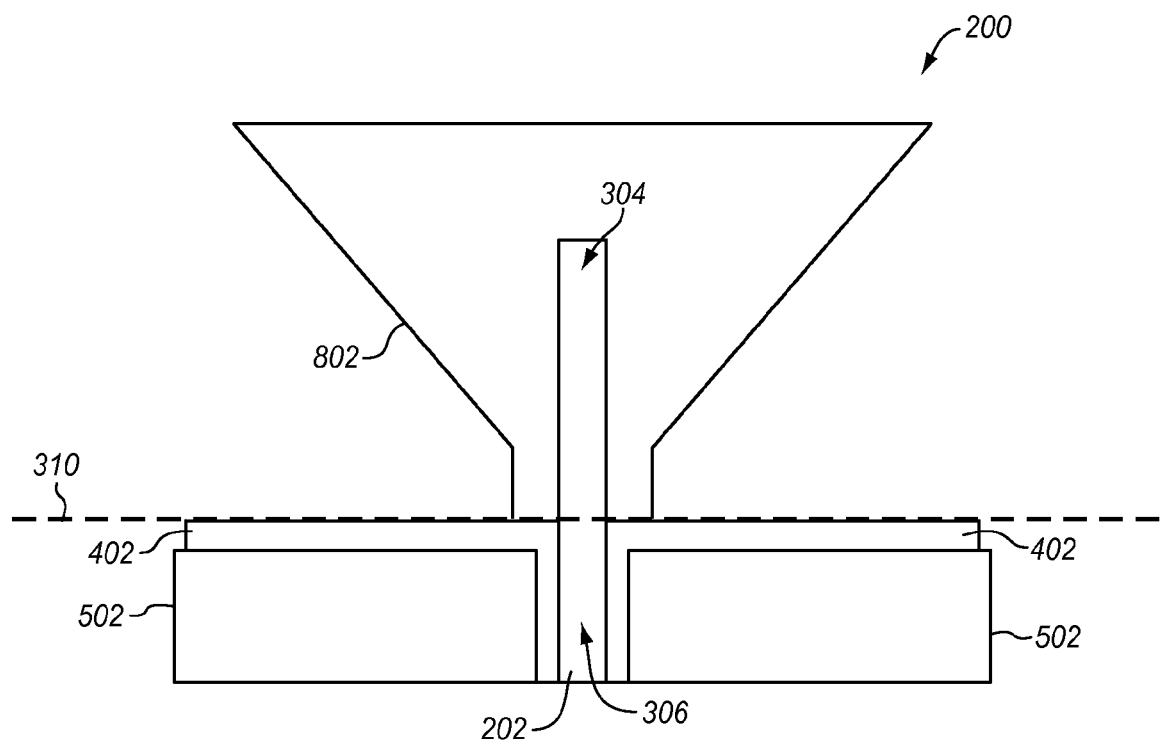

The third mask structure may be formed by depositing a layer of masking material, and performing a photolithographic process to remove portions of the layer of masking material. The removed portions of the layer of the masking material correspond with the dimensions of flared region 802. An electroplating process may then be performed to plate regions of write head 200 exposed by the third mask structure and form flared region 802. FIG. 8 illustrates a top view of write head 200 after completion of step 110 in an exemplary embodiment of the invention.

Figure 9:
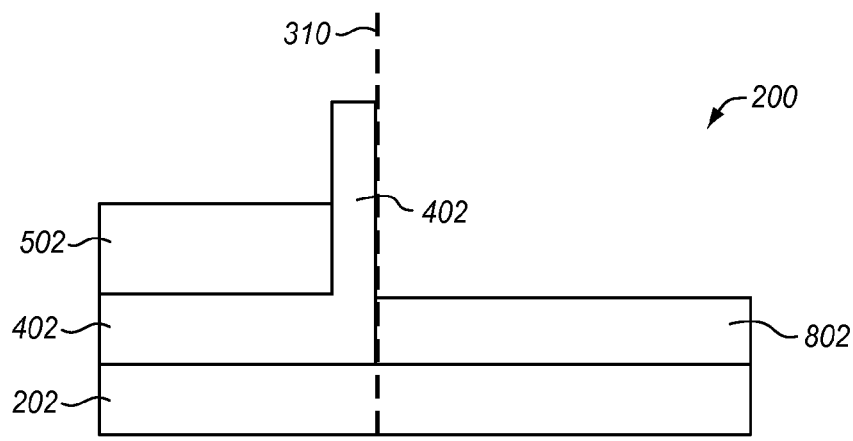

As a result on the plating process, flared region 802 may also be formed over wrap around shield 502 on top of second portion 306 of write pole 202 because of exposure to the plating process of portions of the underlying wrap around shield 502 not covered by the third mask structure. FIG. 9 illustrates a side cross sectional view of write head 200 after completion of step 112 in an exemplary embodiment of the invention. Flared region 802 is formed over write pole 202 on the right side of flare point 310 (see FIG. 9). Other processes, such as a lapping process to form an ABS of write head 200, may be subsequently performed to complete fabrication of write head 200.

Advantageously, write head 200 formed according to method 100 of FIG. 1 forms wrap around shield 502 which is self aligned with flare point 310. Further, flared region 802 is self aligned with flare point 310. Thus, alignment of flare point 310 and track width 204 (see FIG. 2) of write pole 202 with respect to structures of write head 200 are separately and more accurately controlled using method 100 of FIG. 1. This forms a write head 200 having better recording properties.

Figure 10:
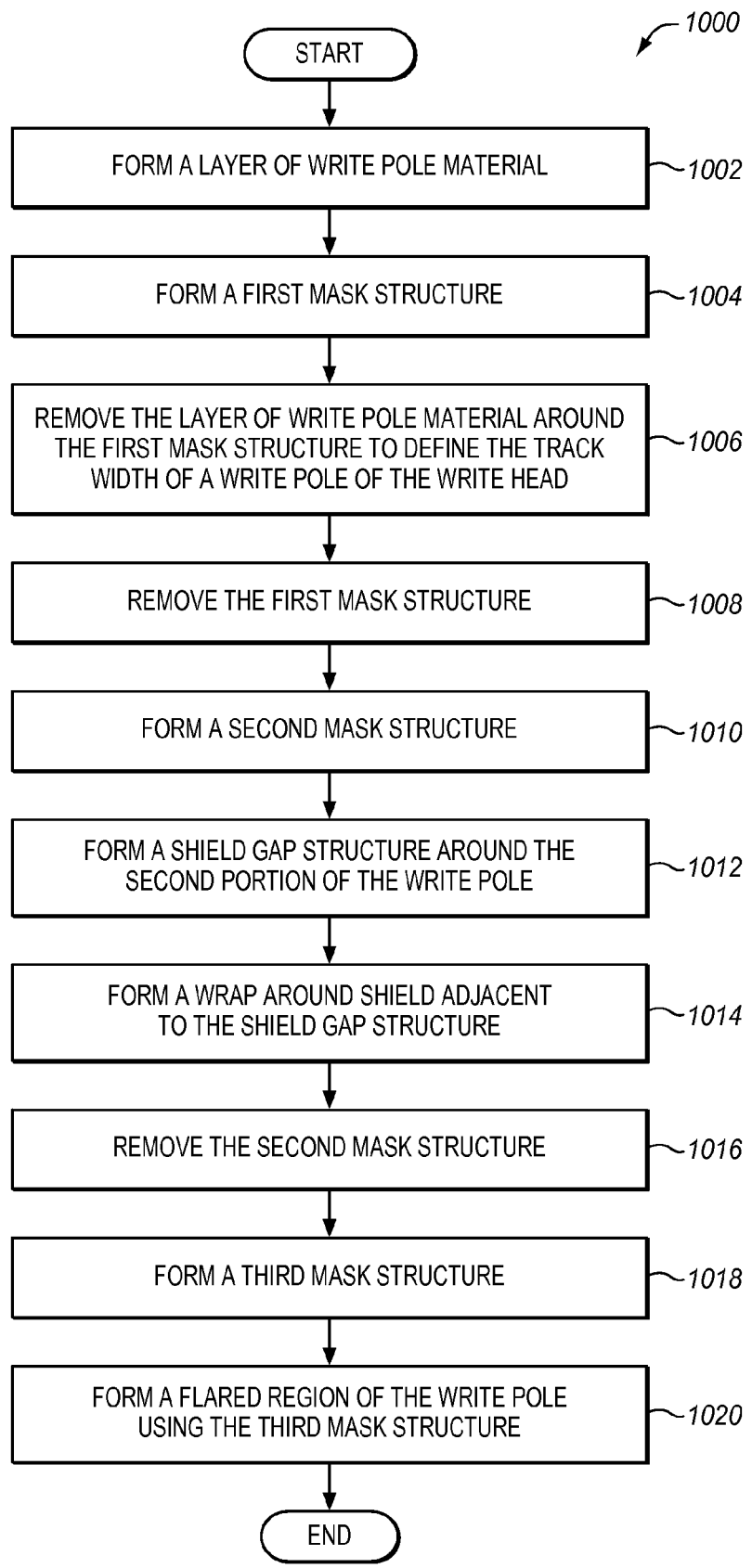
FIG. 10 illustrates another method for fabricating a write head in an exemplary embodiment of the invention.

FIG. 10 illustrates a method 1000 for fabricating a write head in an exemplary embodiment of the invention. FIGS. 11-25 illustrate cross sectional views of a write head 1100 fabricated according to method 1000 of FIG. 10 in exemplary embodiments of the invention. The steps of method 1000 will be described with reference to write head 200 illustrated in FIGS. 11-25. The steps of method 1000 may not be all-inclusive, and may include other steps not shown for the sake of brevity.

Figure 11:
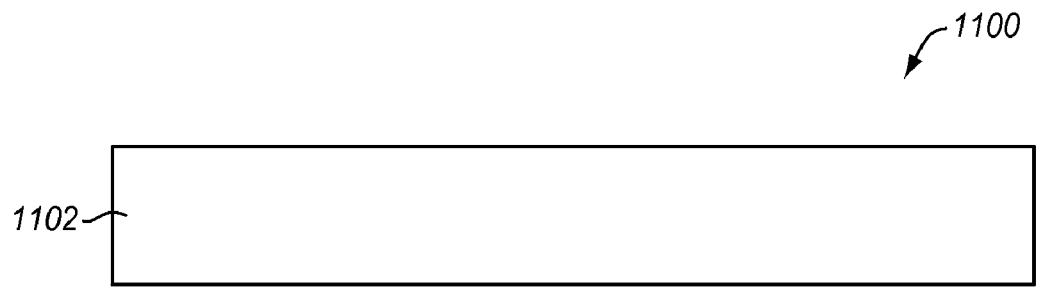
FIGS. 11-25 illustrate cross sectional views of a write head fabricated according to the method of FIG. 10 in exemplary embodiments of the invention.

Step 1002 comprises forming a layer of write pole material 1102. Write pole material 1102 may comprise one or more layers of magnetic materials, such as CoFe. FIG. 11 illustrates a side view of write head 1100 after completion of step 1002 in an exemplary embodiment of the invention.

Figure 12:
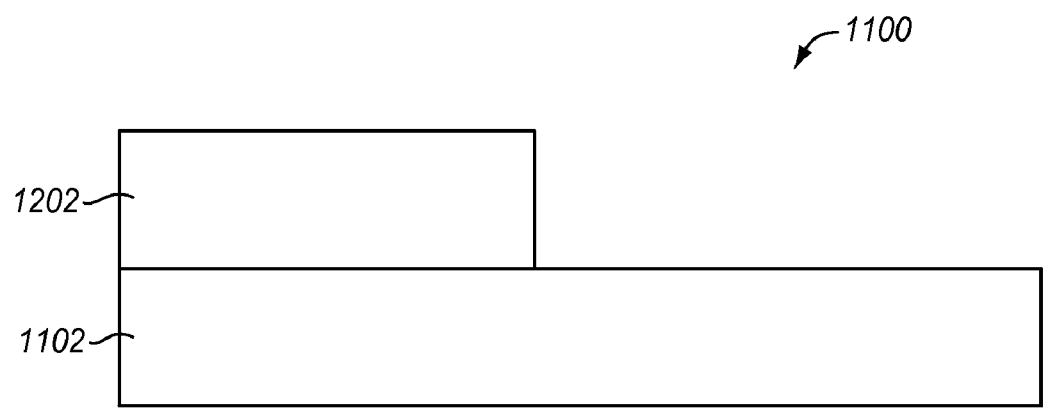
Figure 13:
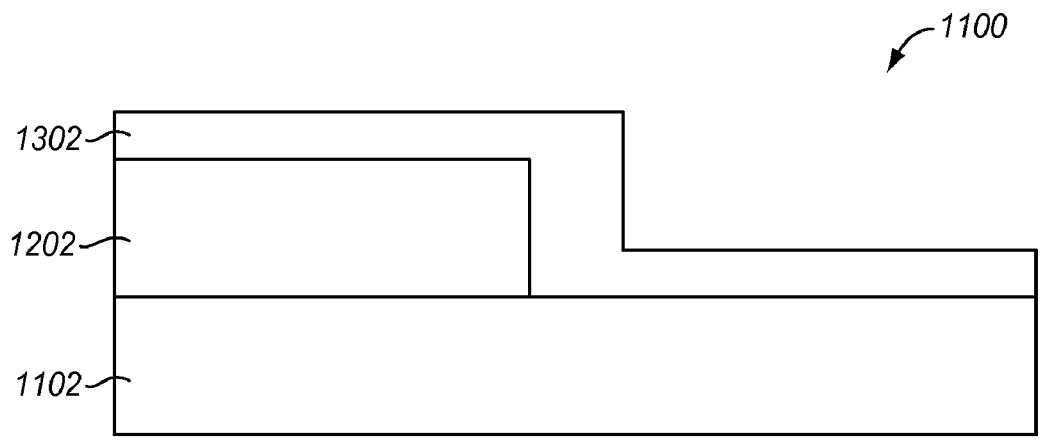
Figure 14:
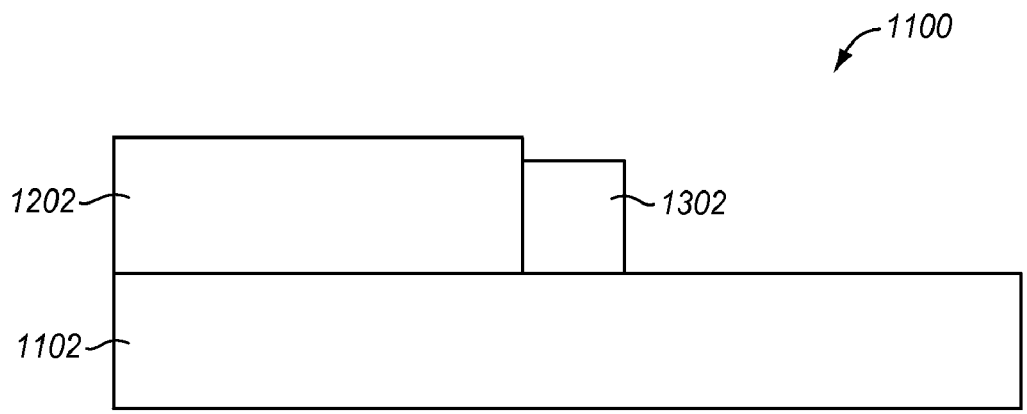
Figure 15:
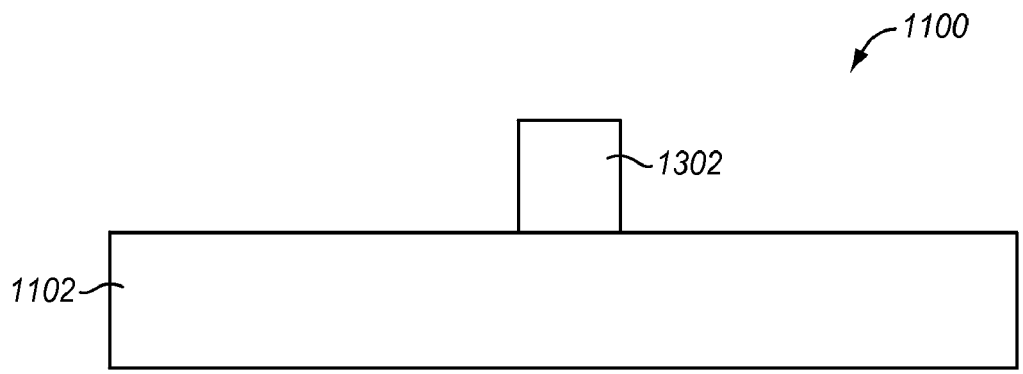

Step 1004 comprises forming a first mask structure on write pole material 11102. First mask structure may be formed by performing a photolithographic process to form photoresistive material 1202 (see FIG. 12) over a portion of write pole material 11102. FIG. 12 illustrates a side view of write head 1100 after deposition of photoresistive material 1202 in an exemplary embodiment of the invention. A layer of non-magnetic material 1302 (see FIG. 13) may then be deposited over write pole material 1102 and photoresistive material 1202. Non-magnetic material 1302 may be $SiO_2$, ALD alumina or other non-magnetic materials. The depth of non-magnetic material 1302 subsequently defines a track width of a write pole of write head 1100. FIG. 13 illustrates a side view of write head 1100 after deposition of non-magnetic material 1302 in an exemplary embodiment of the invention. Next, a removal process (e.g., reactive ion etching (RIE)) is performed to remove flat portions of non-magnetic material 1302 and form first mask structure 1302. FIG. 14 illustrates a side view of write head 1100 after formation of first mask structure 1302 in an exemplary embodiment of the invention. A stripping process (e.g., wet or dry stripping) may then be performed to remove photoresistive material 1202. FIG. 15 illustrates a side view of write head 1100 after completion of step 1004 in an exemplary embodiment of the invention.

Figure 16:
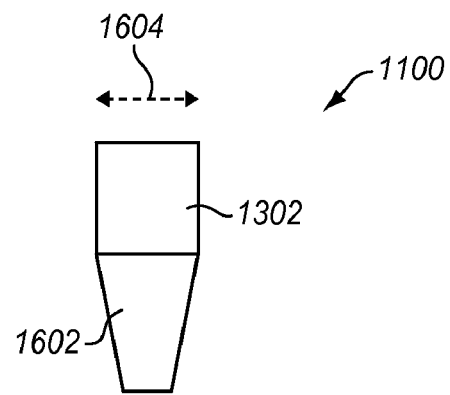

Step 1006 comprises removing write pole material 1102 around first mask structure 1302 to define a track width 1604 (see FIG. 16) of write pole 1602. An Ar ion milling process may be used to define track width 1604 of write pole 1602. FIG. 16 illustrates a side view of write head 1100 after completion of step 1006 in an exemplary embodiment of the invention. Step 1008 comprises removing first mask structure 1302 (e.g., through a stripping process).

Figure 17:
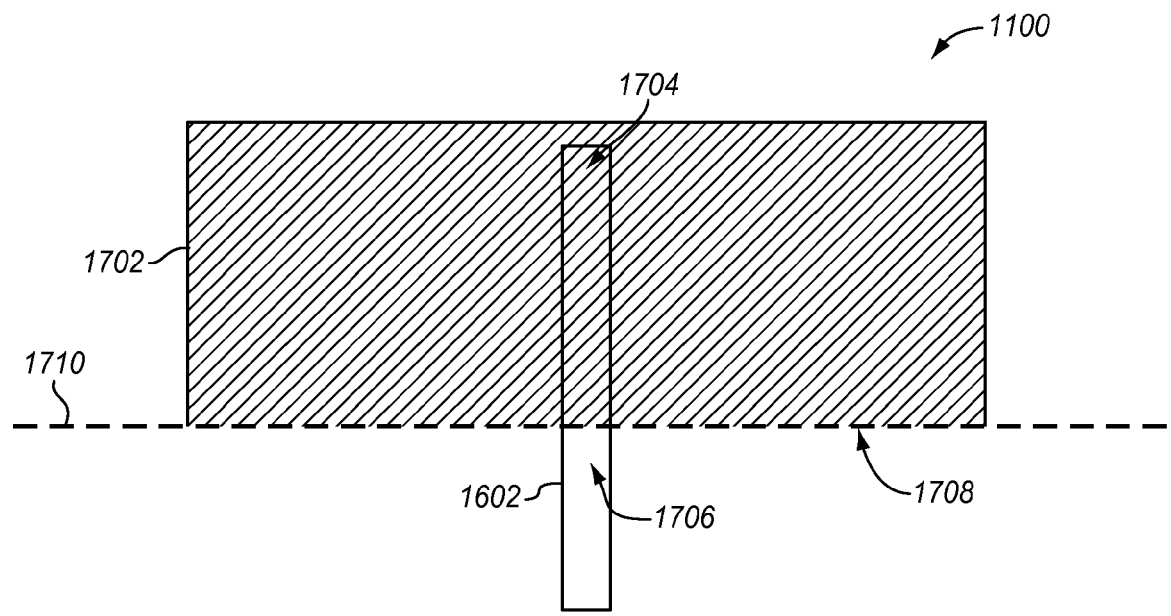

Step 1010 comprises forming a second mask structure 1702 (see FIG. 17) to cover a first portion 1704 of write pole 1602. Second mask structure 1702 may be formed by depositing a layer of masking material, such as a 40 nm layer of Rh, and performing a photolithographic process to remove a portion of the layer of masking material. An edge 1708 of second mask structure 1702 adjacent to an exposed second portion 1706 of write pole 1602 defines a flare point 1710 of write pole 1602. Flare point 1710 may be used as a reference point to form additional structures of write head 1100. FIG. 17 illustrates a top view of write head 1100 after completion of step 1010 in an exemplary embodiment of the invention.

During the photolithographic process of step 1010, electronic lapping guides (ELGS) may be formed and aligned with flare point 1710. ELGs may be formed by depositing and masking ELG material, and using a removal process, such as RIE, to form the ELGs. Thus, the ELGs will be substantially aligned with flare point 1710, and may be used during subsequent lapping processes to form an ABS of write head 1100.

Figure 18:
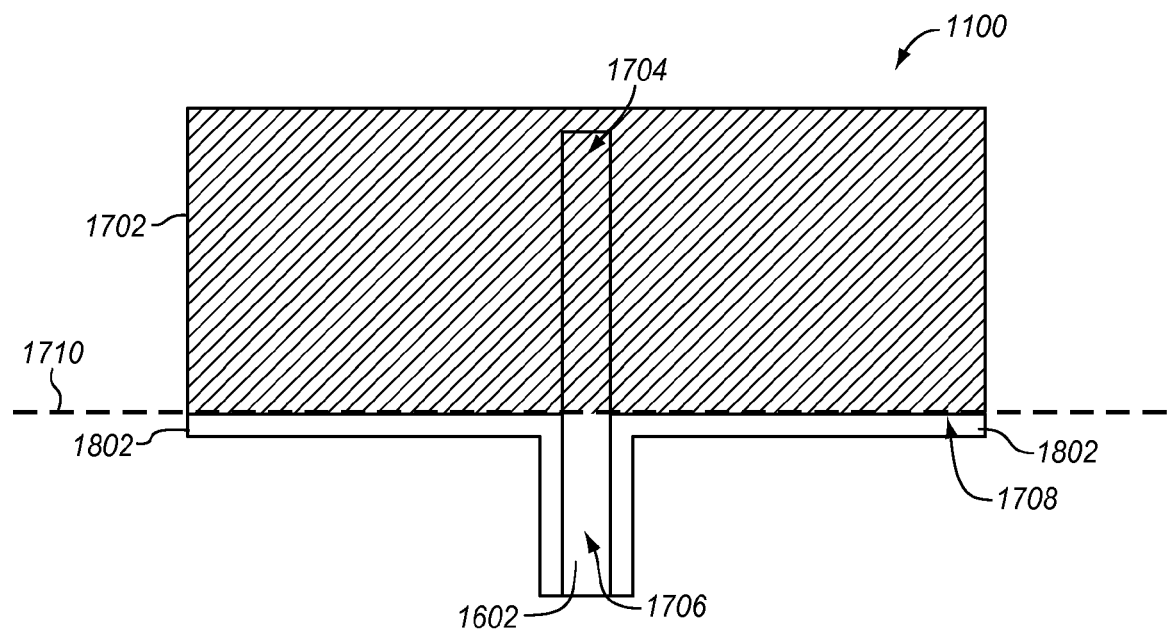

Step 1012 comprises forming a shield gap structure 1802 (see FIG. 18) around second portion 1706 of write pole 1602. Shield gap structure 1802 defines a side gap of a subsequently formed wrap around shield. Shield gap structure 1802 may be formed by depositing a layer of non-magnetic material, such as $Si_3N_4$, and removing a portion (e.g., using RIE) of the layer of non-magnetic material to form shield gap structure 1802. Shield gap structure 1802 is formed along flare point 1710, as well as along sides of second portion 1706 of write pole 1602 and above second portion 1706 of write pole 1602 (not shown in FIG. 18). In a full film deposition process, portions of the layer of non-magnetic material may be removed on top of second mask structure 1702, as well as in regions along the sides of second portion 1706 of write pole 1602. The regions along the sides of second portion 1706 of write pole 1602 are used to subsequently form wrap around shields of write head 1100. FIG. 18 illustrates a top view of write head 1100 after completion of step 1012 in an exemplary embodiment of the invention.

Figure 19:
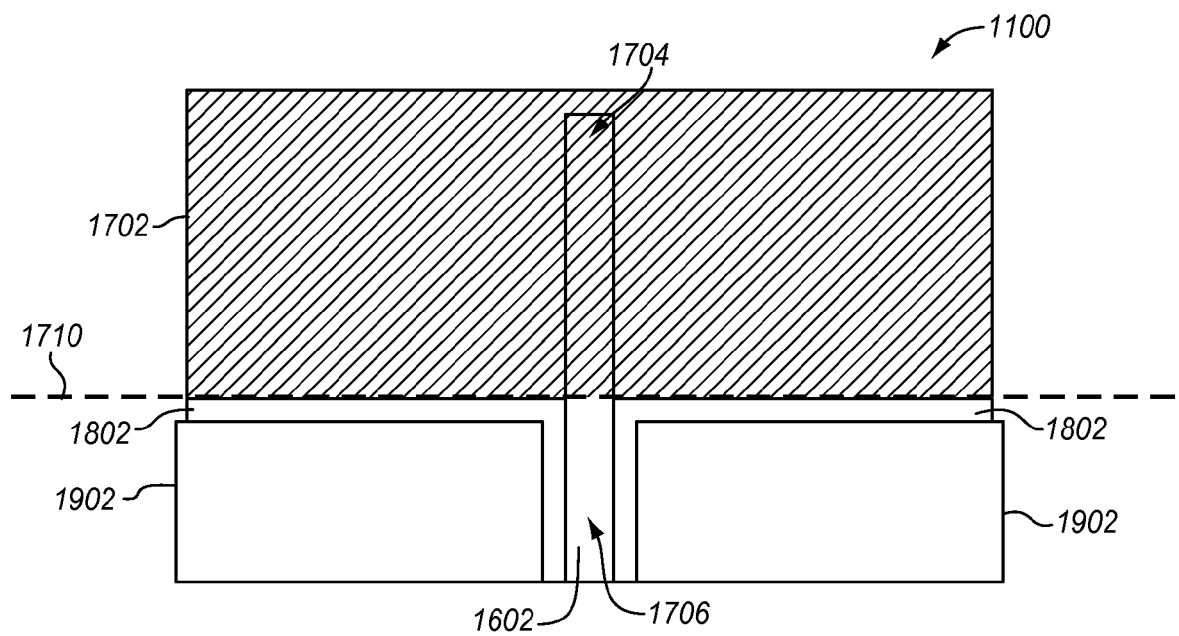

Step 1014 comprises forming a wrap around shield 1902 (see FIG. 19) adjacent to shield gap structure 1802 around second portion 1706 of write pole 1602. Wrap around shield 1902 is separated from flare point 1710 by shield gap structure 1802. A NiFe 44/55 0.5 um electroplating process may be performed to fabricate wrap around shield 1902. FIG. 19 illustrates a top view of write head 1100 after completion of step 1014 in an exemplary embodiment of the invention. Wrap around shield 1902 is also formed over second portion 1706 of write pole 1602 (as described in step 108 of method 100 and not shown in FIG. 19).

Figure 20:
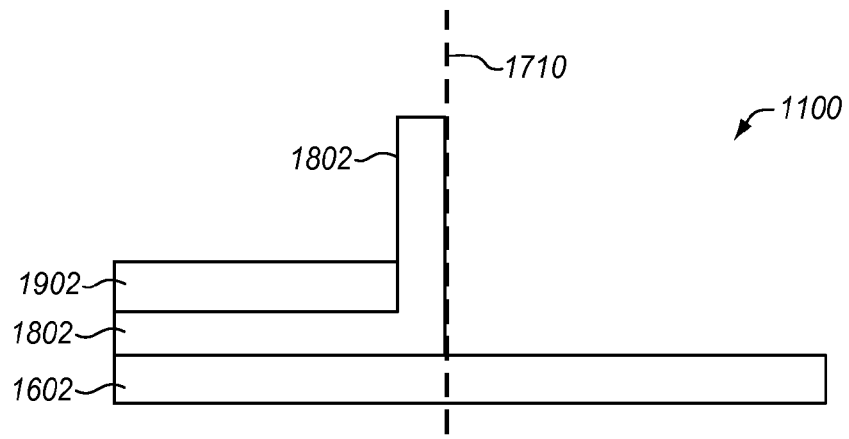

FIG. 20 illustrates a side cross sectional view of write head 1100 after completion of step 1014 in an exemplary embodiment of the invention. Shield gap structure 1802 is formed on top of write pole 1602 along flare point 1710, and extending to a main pole edge of write pole 1602. Wrap around shield 1902 is formed above shield gap structure 1802 and extends to a main pole edge of write pole 1602.

Figure 21:
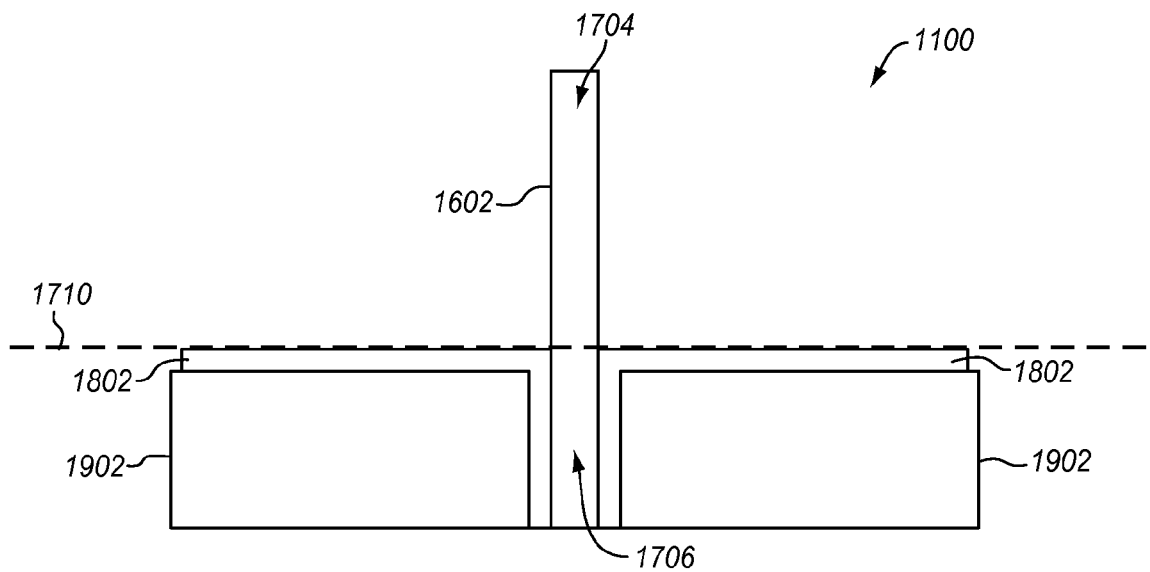
Figure 22:
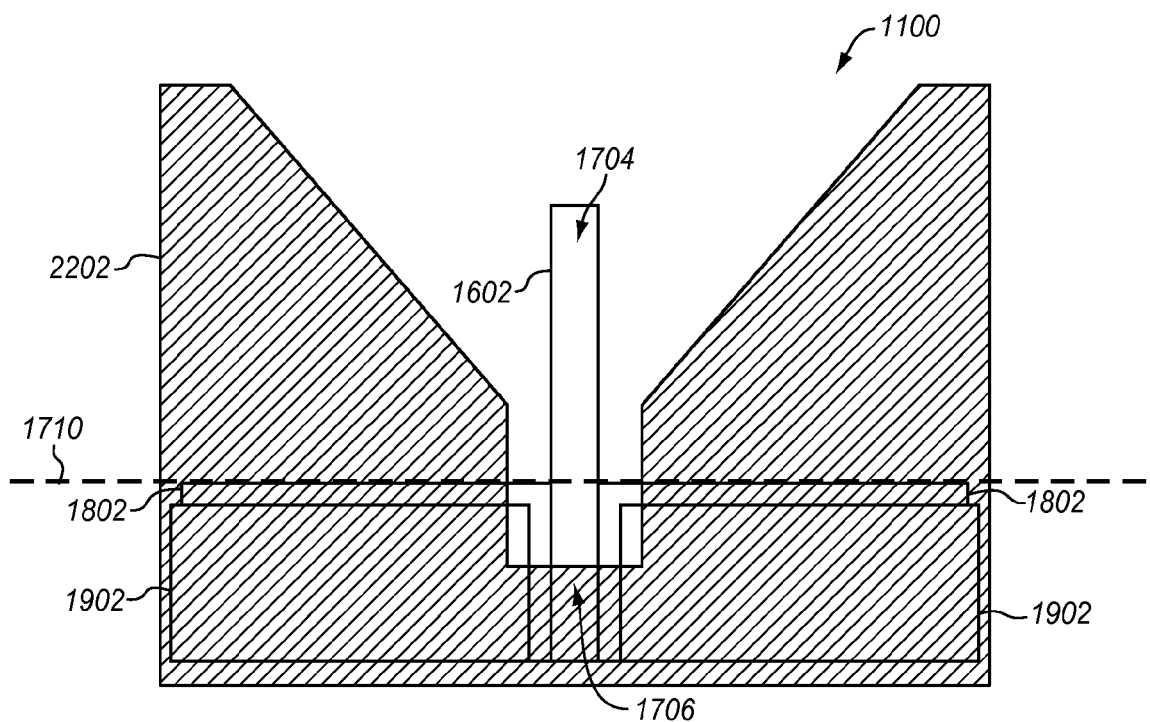

Step 1016 comprises removing second mask structure 1702. Second mask structure 1702 may be removed using a stripping process. FIG. 21 illustrates a top view of write head 1100 after completion of step 1016 in an exemplary embodiment of the invention. Step 1018 comprises forming a third mask structure 2202 (see FIG. 22). Third mask structure 2202 defines dimensions of a subsequently formed flared region of write pole 1602. A layer of photoresistive material is deposited, and a photolithographic process is performed to remove portions of the photoresistive material and form third mask structure 2202. The removed portions of third mask structure 2202 define dimensions of the flared region of write pole 1602. FIG. 22 illustrates a top view of write head 1100 after completion of step 1018 in an exemplary embodiment of the invention.

Figure 23:
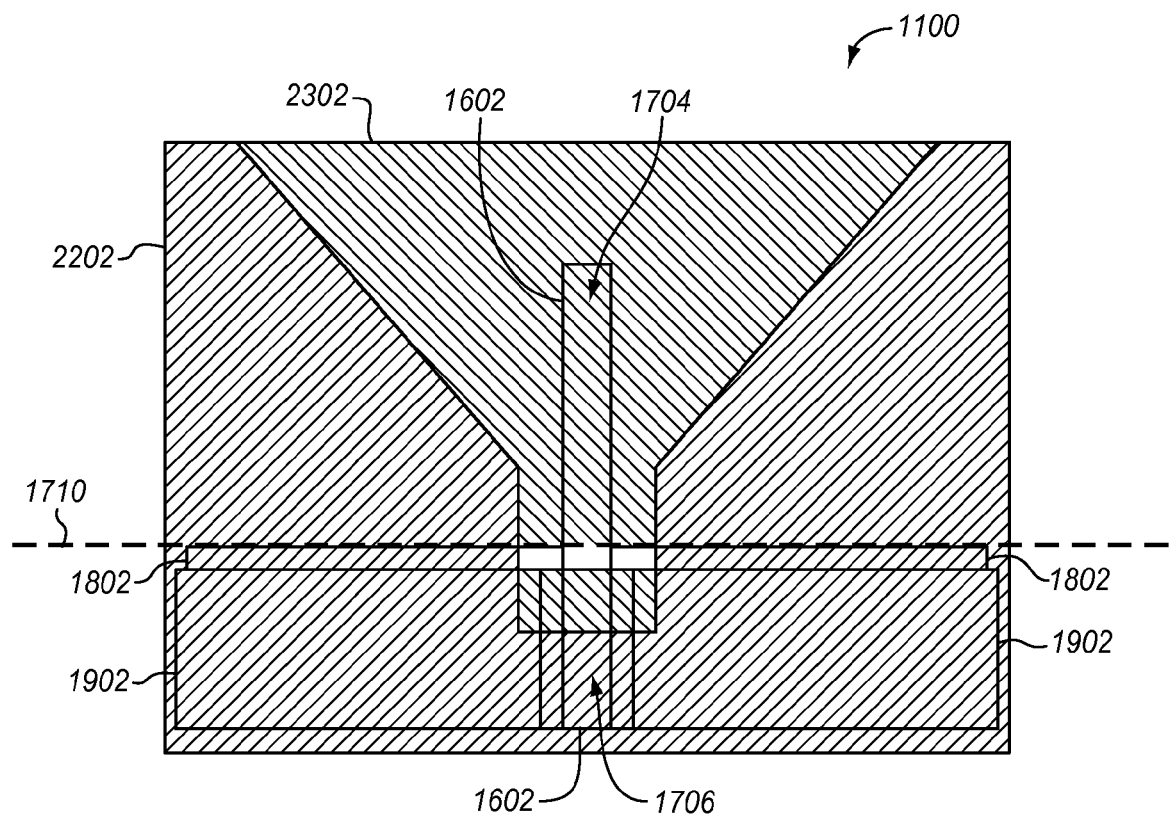

Step 1020 comprises forming a flared region 2302 (see FIG. 23) of write pole 1602 using third mask structure 2202. Flared region 2302 is formed over first portion 1704 of write pole 1602 from flare point 1710. An electroplating process may be performed to form flared region 2302. For example, flared region 2302 may be plated using a 0.3 um layer of NiFe, CoFe or other magnetic material. FIG. 23 illustrates a top view of write head 1100 after completion of step 1020.

Figure 24:
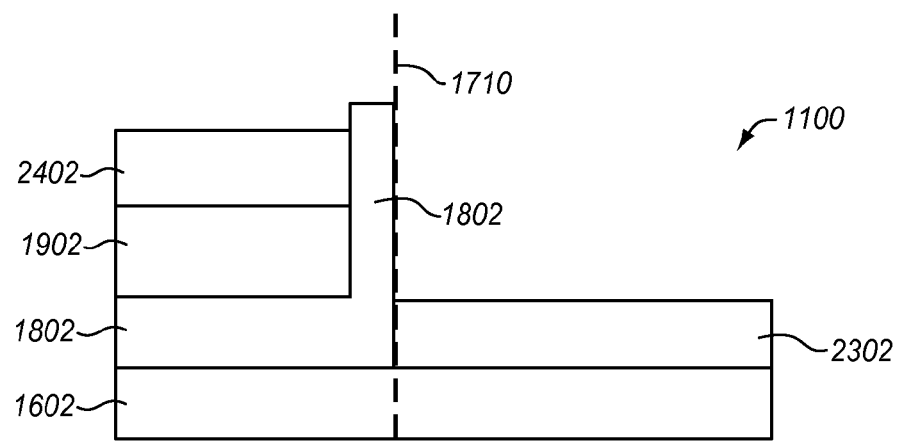

Magnetic material used to form flared region 2302 may also be formed over wrap around shield 1902 on top of second portion 1706 of write pole 1602. FIG. 24 illustrates a side cross sectional view of write head 1100 after completion of step 1020 in an exemplary embodiment of the invention.

Figure 25:
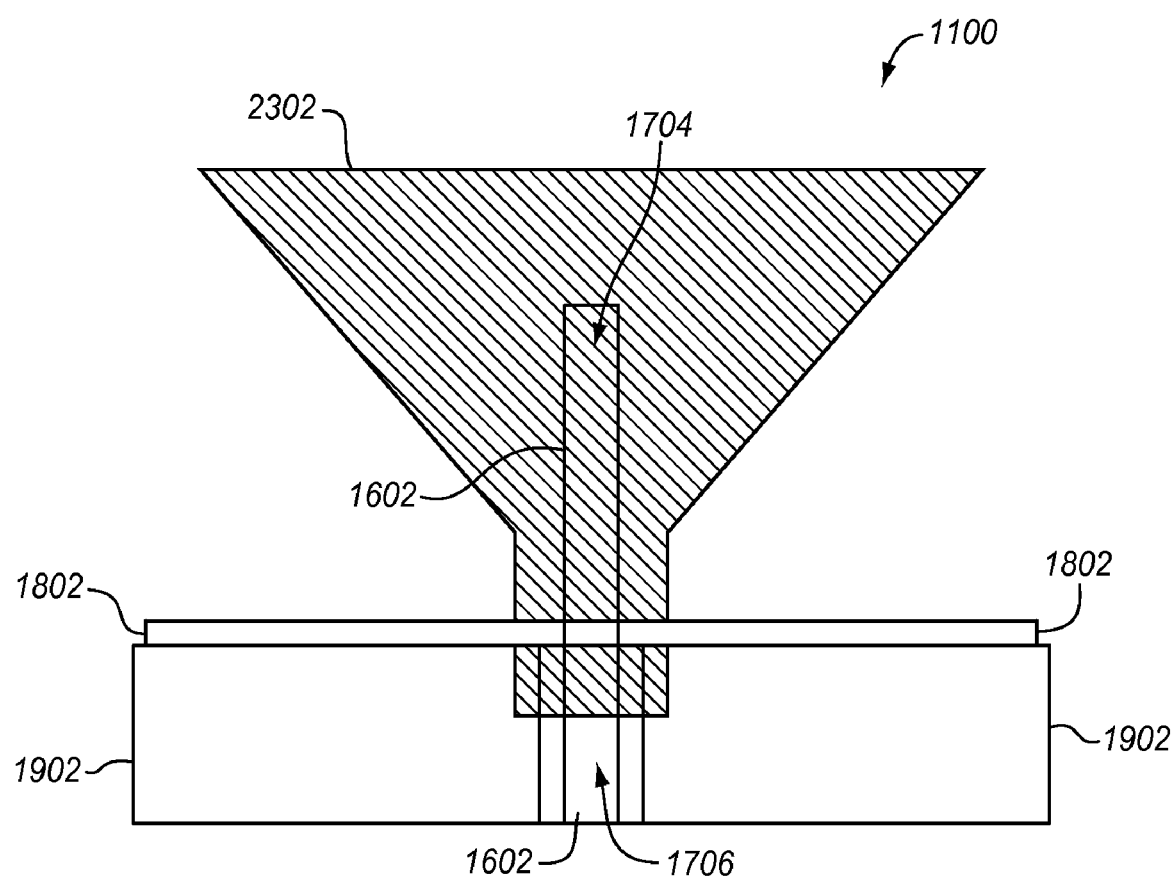

Flared region 2302 is formed over write pole 1602 on the right side of flare point 1710. Magnetic material 2402 may be formed above wrap around shield 1902 on the left side of flare point 1710. This is a byproduct of the plating process, and magnetic material 2402 becomes part of wrap around shield 1902. Magnetic material 2402 is not magnetically coupled to flared region 2302. Third mask structure 2102 may then be removed, and subsequent processes, such as lapping, may be performed to complete fabrication of write head 1100. Refill material may also be formed around write head 1100. FIG. 25 illustrates a top view of write head 1100 after removal of third mask structure 2202.

Figure 26:
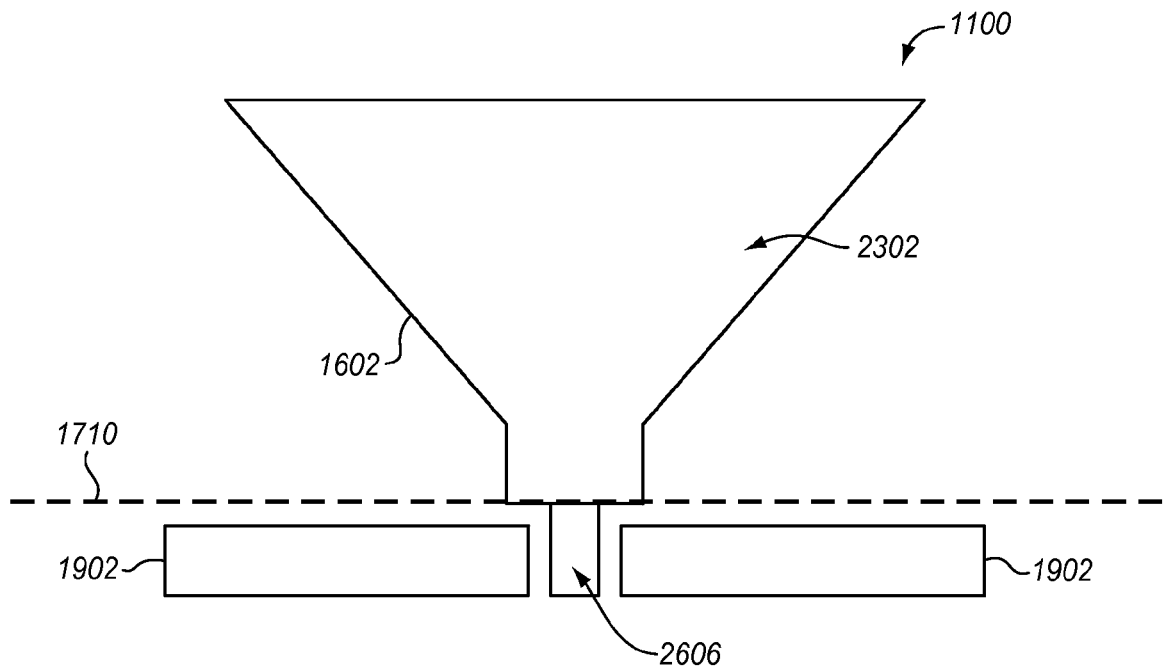
FIG. 26 illustrates a top view of a properly aligned write head fabricated according to the method of FIG. 10 in an exemplary embodiment of the invention.
Figure 27:
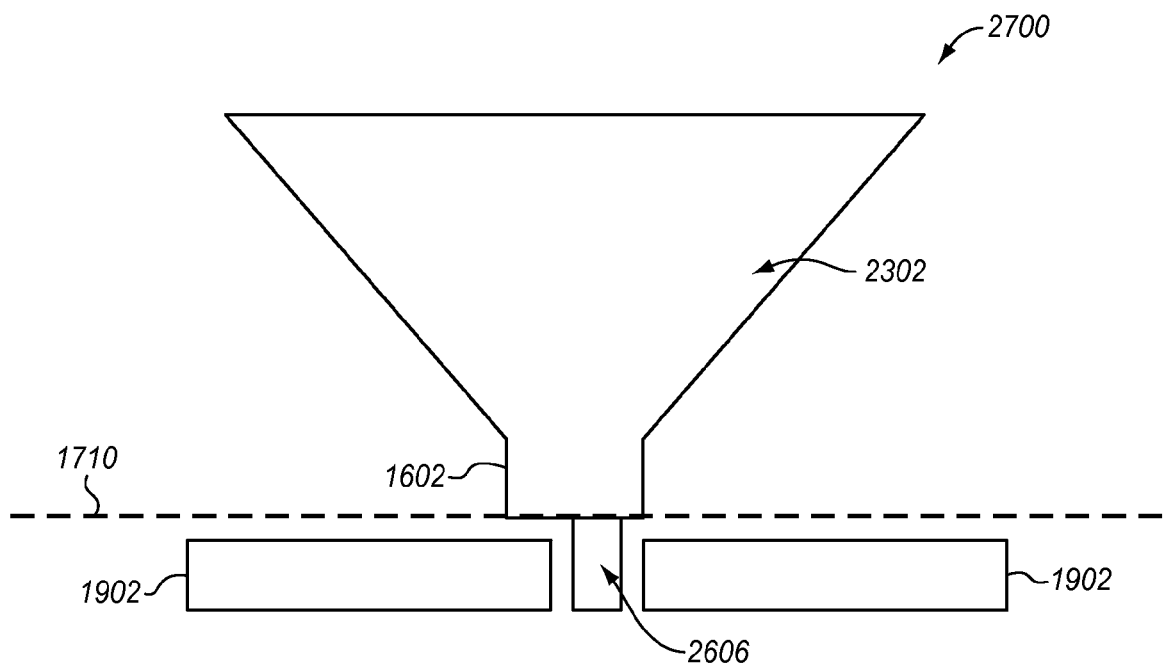
FIG. 27 illustrates a top view of a misaligned write head.

FIG. 26 illustrates a top view of a properly aligned write head 1100 fabricated according to method 1000 in an exemplary embodiment of the invention. More specifically, main pole 2602 is properly aligned with flared region 2302. Occasionally, alignment issues occur, and main pole 2602 is not properly aligned with flared region 2302. FIG. 27 illustrates a top view of a misaligned write head 2700, where main pole 2602 is not aligned evenly with flared region 1202. Main pole 2602 misalignment may cause recording problems of write head 1100, because if main pole 2602 is misaligned too far from the center of flared region 2302, there will be an insufficient amount of surface area of flared region 2302 on each side of main pole 2602 and in contact with main pole 2602. As a result, write head 2700 does not have sufficient magnetic properties for properly performing recording processes.

Figure 28:
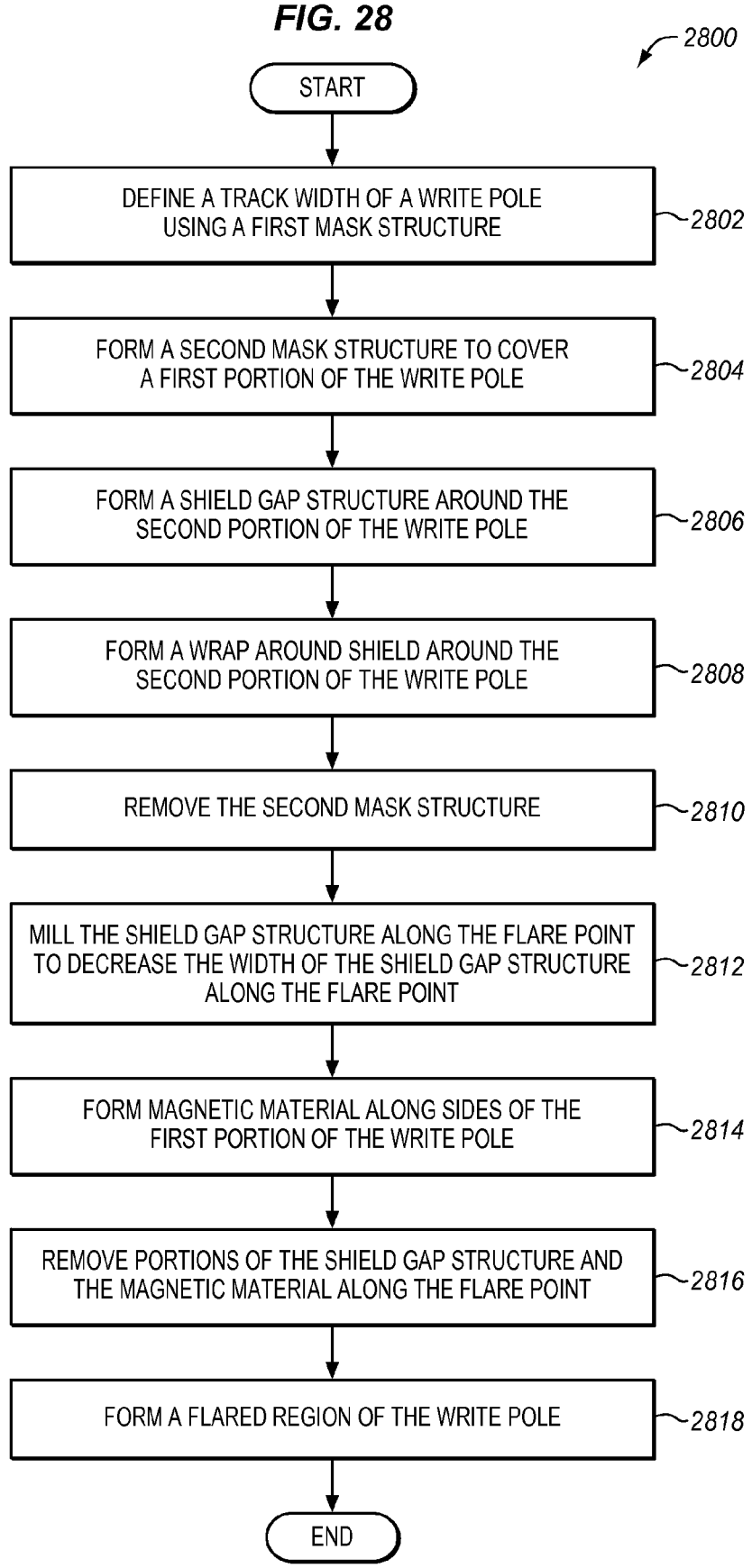
FIG. 28 illustrates another method for fabricating a write head with an increased tolerance for misalignment in an exemplary embodiment of the invention.

FIG. 28 illustrates a method 2800 for fabricating a write head with an increased tolerance for misalignment in an exemplary embodiment of the invention. FIGS. 29-33 illustrate cross sectional views of a write head 2900 fabricated according to method 2800 of FIG. 28 in exemplary embodiments of the invention. The steps of method 2800 will be described with reference to write head 2900 illustrated in FIGS. 29-33. The steps of method 2800 may not be all-inclusive, and may include other steps not shown for the sake of brevity.

Step 2802 comprises defining a track width of a write pole 1602 (see FIG. 16) using a first mask structure. The track width of write pole 1602 may be defined as described in steps 1002-1006 of FIG. 10. After completion of step 2802, write head 2900 may look similar to write head 1100 illustrated in FIG. 16. First mask structure 1302 may then be removed from write pole 1602.

Figure 29:
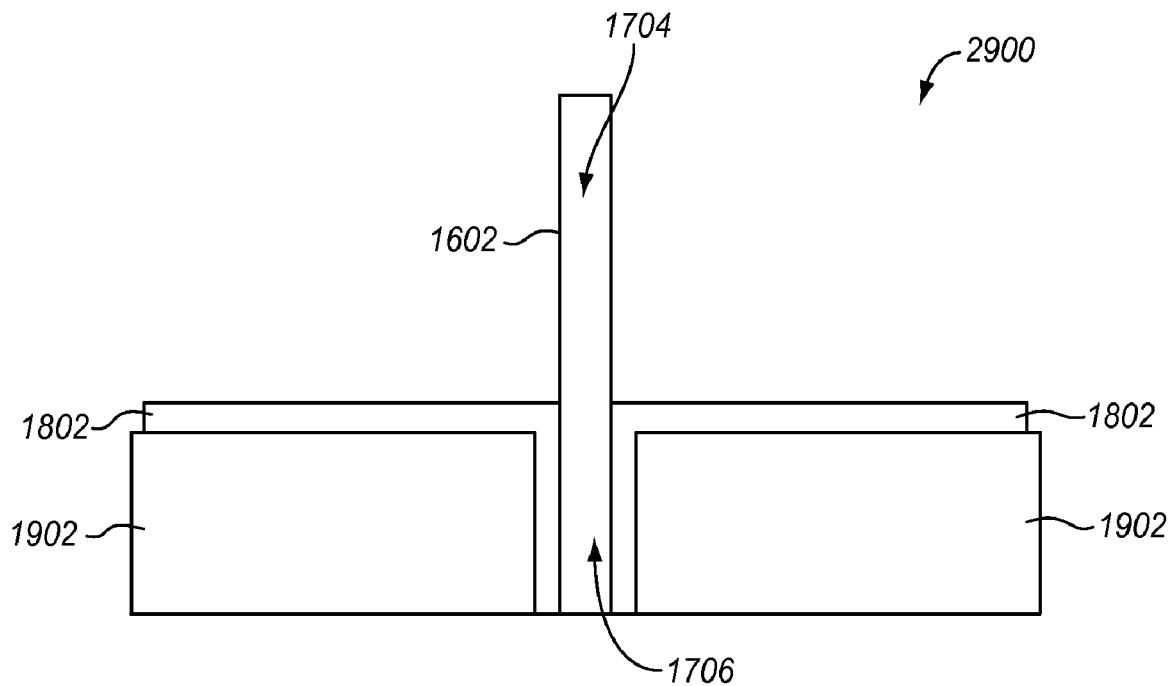
FIGS. 29-33 illustrate cross sectional views of a write head fabricated according to the method of FIG. 28 in an exemplary embodiment of the invention.

Step 2804 comprises forming a second mask structure to cover a first portion of write pole 1602. The second mask structure may be formed as described in step 1010 of FIG. 10. After completion of step 2804, write head 2900 may look similar to write head 1100 illustrated in FIG. 17. In step 2806, a shield gap structure 1802 (see FIG. 18) is formed around a second portion 1706 of write pole 1602. Shield gap structure 1802 may be formed as described in step 1012 of FIG. 10. After completion of step 2806, write head 2900 may look similar to write head 1100 illustrated in FIG. 18. Step 2808 comprises forming a wrap around shield 1902 around second portion 1706 of write pole 1602. Wrap around shield 1902 may be formed as described in step 1014 of FIG. 10. After completion of step 2808, write head 2900 may look similar to write head 1100 illustrated in FIG. 19. Step 2810 comprises removing the second mask structure. The second mask structure may be removed as described in step 1016 of FIG. 10. FIG. 29 illustrates a top view of write head 2900 after completion of step 2810.

Figure 30:
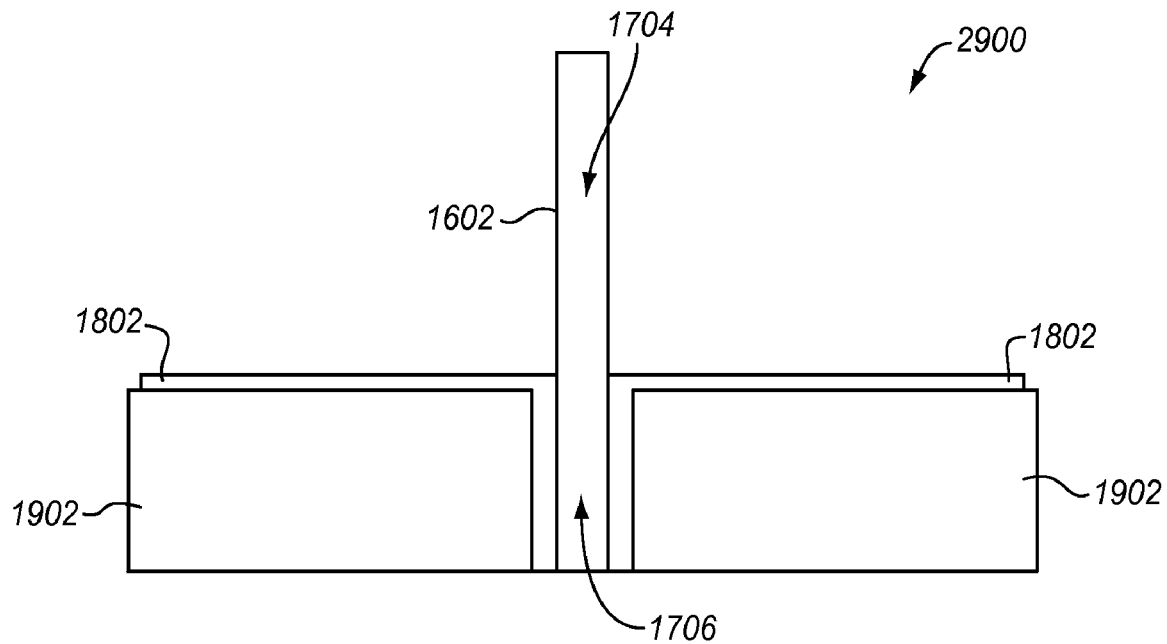

Step 2812 comprises milling shield gap structure 1802 along flare point 1710 to decrease the width of shield gap structure 1802 along flare point 1710. The milling process may be performed using an AR or $CHF_3$ ion milling process. FIG. 30 illustrates a top view of write head 2900 after completion of step 2812.

Figure 31:
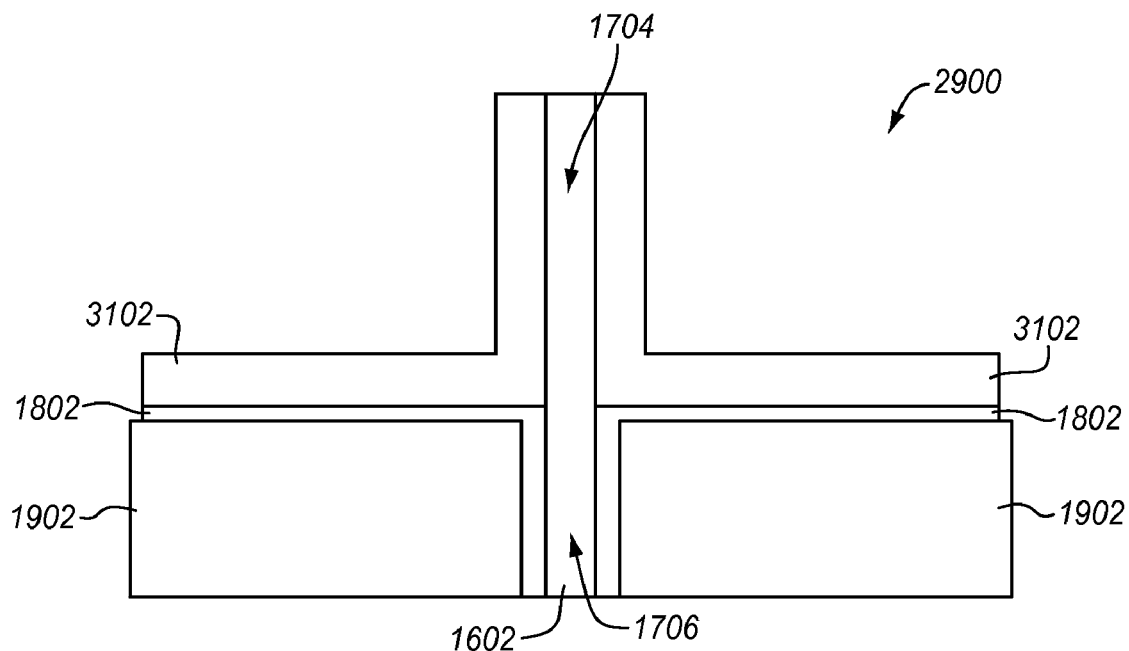

Step 2814 comprises forming magnetic material 3102 along sides of first portion 1704 of write pole 1602 to increase the thickness of write pole 1602. Magnetic material 3102 may be formed by depositing a full layer of NiFe, CoFe, CoNiFe or other magnetic material, and milling the layer of magnetic material 3102 to remove portions of magnetic material 3102 on sides of first portion 1704 of write pole 1602 and to remove magnetic material 3102 around second portion 1706 of write pole 1602. FIG. 31 illustrates a top view of write head 2900 after completion of step 2814.

Figure 32:
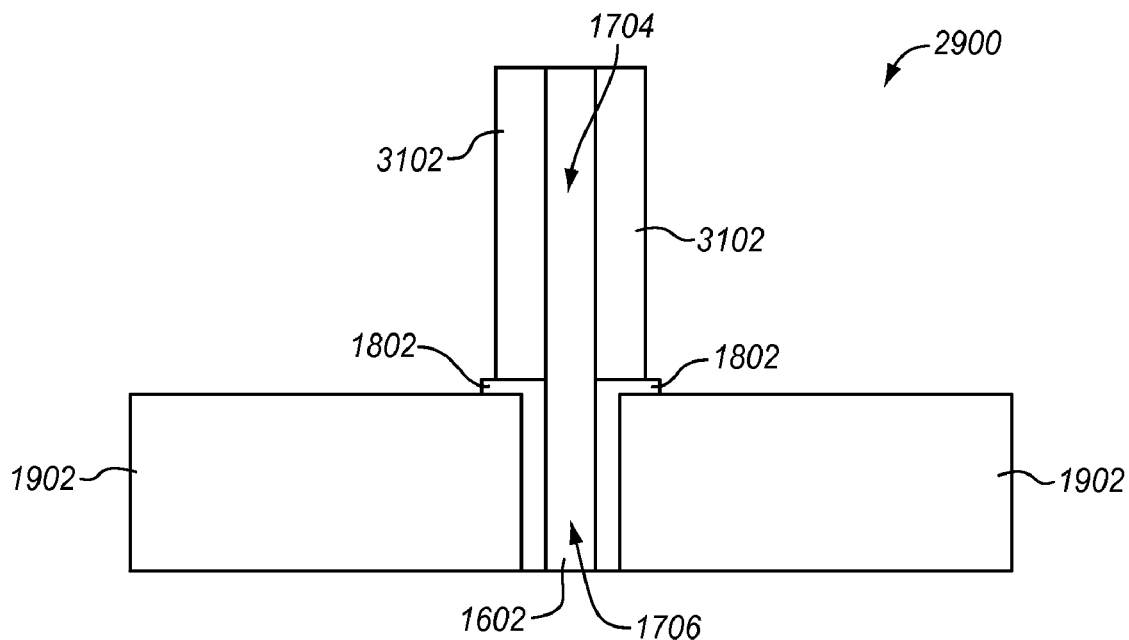

Step 2816 comprises removing portions of side gap structure 1802 and magnetic material 3102 along flare point 1710. An AR ion milling process may be performed to remove portions of side gap structure 1802 and magnetic material 3102 perpendicular to write pole 1602. FIG. 32 illustrates a top view of write head 2900 after completion of step 2816.

Figure 33:
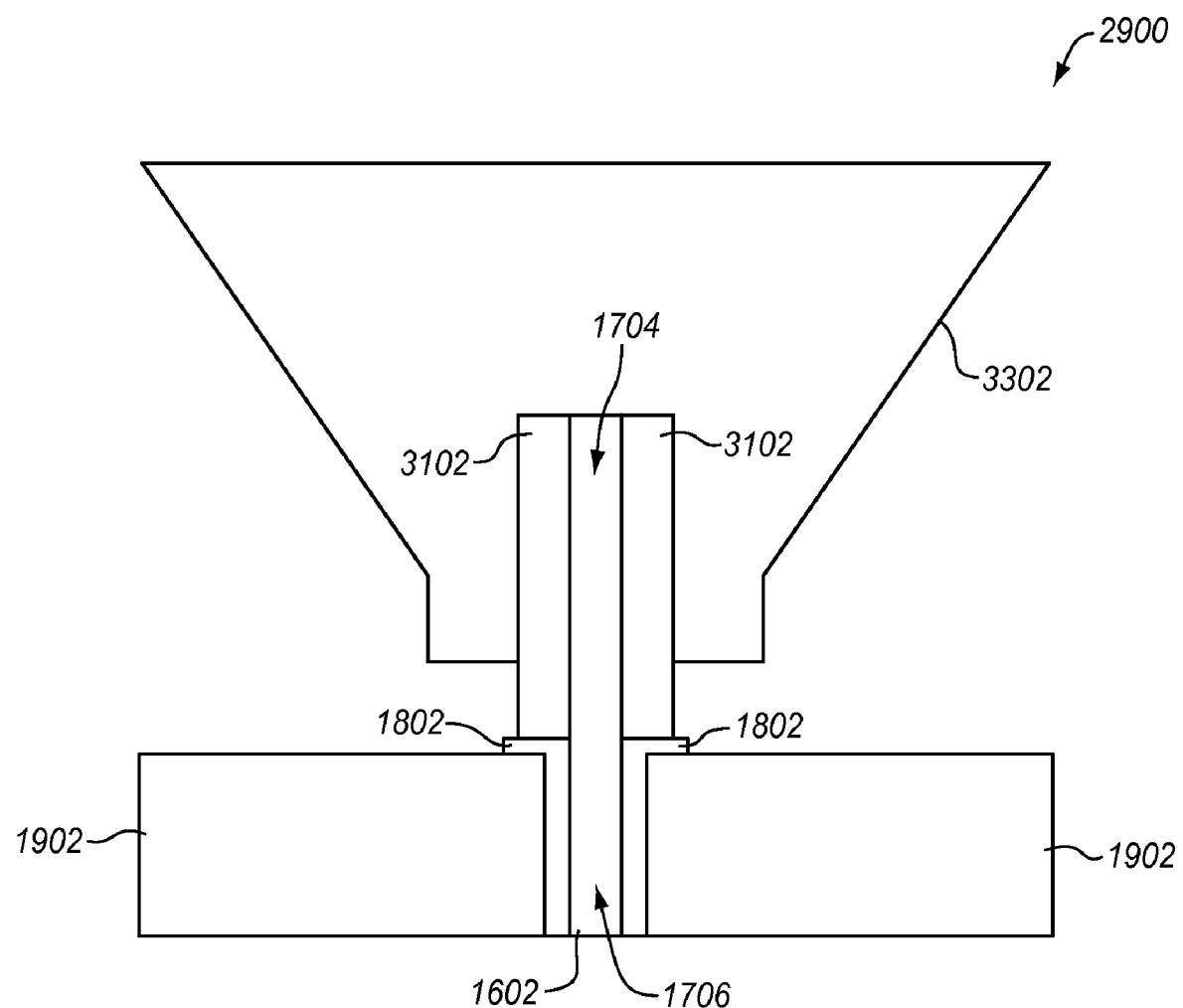

Step 2818 comprises forming a flared region 3302 of write pole 1602 using a third mask structure. Flared region 3302 may be formed as described in step 1020 of FIG. 10. FIG. 33 illustrates a top view of write head 2900 after completion of step 2818. Write head 2900 allows an increased tolerance in the alignment of main pole 3304 with respect to flared region 3302 above flare point 1710. More specifically, the increased thickness of second portion 1706 of write pole 1602 provides a wider tolerance for aligning main pole 3304 with flared region 3302 of write pole 1602, because the surface edge of flared region 3302 along the flare point is wider. If main pole 3304 is misaligned from the center of flared region 3302, there will still be a sufficient amount of surface area of flared region 3302 on each side of main pole 3304 to provide adequate magnetic properties for write head 2900. Advantageously, the horizontal alignment tolerance of main pole 3304 and flared region 3302 is relieved by a factor of two, which makes misalignment issues less fatal and less likely to cause writing problems during operation of write head 2900.

Although specific embodiments were described herein, the scope of the invention is not limited to those specific embodiments. The scope of the invention is defined by the following claims and any equivalents thereof.

We claim:

1. A method for fabricating a write head, the method comprising:

defining a track width of a write pole of the write head using a first mask structure;

forming a second mask structure to cover a first portion of the write pole, with an edge of the second mask structure adjacent to an exposed second portion of the write pole defining a flare point of the write pole;

forming a shield gap structure around the second portion of the write pole;

forming a wrap around shield around the second portion of the write pole, wherein the wrap around shield is separated from the flare point by the shield gap structure;

removing the second mask structure; and forming a flared region of the write pole using a third mask structure, wherein the flared region is formed over the first portion of the write pole from the flare point.

2. The method of claim 1, wherein defining the track width of the write pole further comprises:

depositing write pole material;

forming the first mask structure on the write pole material;

removing regions of the write pole material unprotected by the first mask structure; and removing the first mask structure.

3. The method of claim 1, wherein forming the second mask structure further comprises:

depositing a layer of second mask structure material; and performing a photolithographic process to remove a portion of the layer of second mask structure material, wherein the edge of the second mask structure formed by the photolithographic process defines the flare point.

4. The method of claim 1, wherein forming the shield gap structure further comprises:

depositing a layer of shield gap structure material;

etching the layer of shield gap structure material on top of the second mask structure; and etching portions of the layer of shield gap structure material on side regions of the write pole to create areas for the wrap around shield.

5. The method of claim 4, wherein forming the wrap around shield further comprises:

performing a plating process to deposit wrap around shield material in the areas etched in the shield gap material.

6. The method of claim 1, wherein forming the flared region of the write pole using the third mask structure further comprises:

depositing a layer of third mask structure material;

performing a photolithographic process to remove portions of the layer of third mask structure material, wherein the removed portions define dimensions of the flared region of the write pole; and performing a plating process to deposit magnetic material in regions of the write head unprotected by the third mask structure.

* * * * *

UNITED STATES PATENT AND TRADEMARK OFFICE
CERTIFICATE OF CORRECTION

PATENT NO. : 7,877,859 B2  Page 1 of 1
APPLICATION NO. : 11/767330
DATED : February 1, 2011
INVENTOR(S) : Wen-Chien Hsiao It is certified that error appears in the above-identified patent and that said Letters Patent is hereby corrected as shown below:

In column 5, line 19, the text "write pole material 11102" should read "write pole material 1102".

In column 5, line 22, the text "write pole material 11102" should read "write pole material 1102".

In column 5, line 64, the text "ELGS" should read "ELGs".

Signed and Sealed this
Nineteenth Day of April, 2011

David J. Kappos
*Director of the United States Patent and Trademark Office*